(12) United States Patent
Chang (10) Patent No.: US 10,248,841 B2
(45) Date of Patent: Apr. 2, 2019

(54) METHOD OF PROTECTING AN IMAGE BASED ON FACE RECOGNITION, AND SMART TERMINAL

(71) Applicant: Hisense Mobile Communications Technology Co., Ltd., Qingdao (CN)

(72) Inventor: Xuejian Chang, Qingdao (CN)

(73) Assignees: Hisense Mobile Communications Technology Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 100 days.

(21) Appl. No.: 15/278,292

(22) Filed: Sep. 28, 2016

(65) Prior Publication Data

US 2017/0235999 A1    Aug. 17, 2017

(30) Foreign Application Priority Data

Feb. 17, 2016   (CN) .......................... 2016 1 0089345

(51) Int. Cl.
| | |
|---|---|
| *G06K 9/00* | (2006.01) |
| *H04N 1/32* | (2006.01) |
| *H04N 1/44* | (2006.01) |
| *H04N 5/77* | (2006.01) |

(52) U.S. Cl.
CPC ..... *G06K 9/00255* (2013.01); *G06K 9/00288* (2013.01); *H04N 1/32128* (2013.01); *H04N 1/444* (2013.01); *H04N 5/772* (2013.01); *H04N 2201/325* (2013.01); *H04N 2201/3295* (2013.01)

(58) Field of Classification Search
USPC ........................................................ 382/118
See application file for complete search history.

(56) References Cited

U.S. PATENT DOCUMENTS

| | | | | |
|---|---|---|---|---|
| 2005/0072846 | A1* | 4/2005 | Lubow ............. | G06K 19/06028 235/462.01 |
| 2005/0086241 | A1* | 4/2005 | Ram ................... | G06F 11/1453 |
| 2006/0161588 | A1* | 7/2006 | Nomoto ............ | G06F 17/30247 |
| 2008/0106617 | A1* | 5/2008 | Hanada ............. | H04N 5/23293 348/231.99 |

(Continued)

FOREIGN PATENT DOCUMENTS

| | | |
|---|---|---|
| CN | 102549591 A | 7/2012 |
| CN | 103365922 A | 10/2013 |

(Continued)

OTHER PUBLICATIONS

Office Action from corresponding Chinese Application No. 201610089345.8 dated Mar. 21, 2018 (5 pages).

*Primary Examiner* — Jerome Grant, II
(74) *Attorney, Agent, or Firm* — Harness, Dickey & Pierce, P.L.C.

(57) ABSTRACT

The disclosure discloses a method and apparatus for protecting an image based on face recognition, the method including: recognizing, by a smart terminal, at least one face image in an image; setting, by the smart terminal, a protection flag for the image, and storing the image, upon determining that one of the at least one face image in the image matches successfully with one of face images in a protection list stored in the smart terminal, wherein the protection flag is configured to protect the image from accidental deletion.

15 Claims, 5 Drawing Sheets

(56) References Cited

U.S. PATENT DOCUMENTS

| | | | |
|---|---|---|---|
| 2014/0165176 A1 | 6/2014 | Ow | |
| 2016/0055393 A1* | 2/2016 | Feng | G06K 9/6202 |
| | | | 382/199 |
| 2017/0076400 A1* | 3/2017 | Woo | H04L 63/083 |
| 2017/0357802 A1* | 12/2017 | Spector | G06T 1/60 |

FOREIGN PATENT DOCUMENTS

| | | |
|---|---|---|
| CN | 103745144 A | 4/2014 |
| CN | 104463177 A | 3/2015 |
| CN | 104778416 A | 7/2015 |
| CN | 104866362 A | 8/2015 |
| CN | 105117624 A | 12/2015 |

\* cited by examiner

METHOD OF PROTECTING AN IMAGE BASED ON FACE RECOGNITION, AND SMART TERMINAL

CROSS-REFERENCES TO RELATED APPLICATION

This application claims the benefit and priority of Chinese Patent Application No. 201610089345.8 filed Feb. 17, 2016. The entire disclosure of the above application is incorporated herein by reference.

FIELD

The present disclosure relates to the field of image protection, and particularly to a method of protecting an image based on face recognition, and a smart terminal.

BACKGROUND

This section provides background information related to the present disclosure which is not necessarily prior art.

More and more users capture and process images using their smart terminals, and if a user is deleting an image, then he or she may delete by mistake some image of an important person, and it may be difficult for the user to recover the image deleted by mistake. For example, a folder in a library of images in an existing mobile terminal can be deleted, and if there is an operation by mistake, or some image of an important person in the folder is forgotten, then the image may be deleted by mistake, so it is currently desirable to protect the image in this case.

SUMMARY

This section provides a general summary of the disclosure, and is not a comprehensive disclosure of its full scope or all of its features.

An object of the disclosure is to provide a method of protecting an image based on face recognition, and a smart terminal so as to avoid an important image from being deleted by mistake.

In an aspect, some embodiments of the disclosure provide a method of protecting an image based on face recognition, the method including:

recognizing, by a smart terminal, at least one face image in an image acquired;

setting, by the smart terminal, a protection flag for the image, and storing the image, upon determining that one of the at least one face image in the image matches successfully with one of face images in a protection list stored in the smart terminal, wherein the protection flag is configured to protect the image from accidental deletion.

In another aspect, some embodiments of the disclosure provide a smart terminal including:

a memory; and one or more processors, wherein:

the memory stores computer readable program codes, and the one or more processors execute the computer readable program codes:

to recognize at least one face image in an image acquired;

to set a protection flag for the image, and to store the image, upon determining that one of the at least one face image in the image matches successfully with one of face images in a protection list stored in the smart terminal, wherein the protection flag is configured to protect the image from accidental deletion.

In another aspect, some embodiments of the disclosure provide a smart terminal including:

a memory; and one or more processors, wherein:

the memory stores computer readable program codes, and the one or more processors execute the computer readable program codes:

to receive an image deletion instruction;

to determine whether an image to be deleted includes a face area; and if the image to be deleted comprises the face area, to recognize the face area, to determine that the image to be deleted is a protected image, and to ignore an operation of the image deletion instruction on the image to be deleted.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Figure 1:
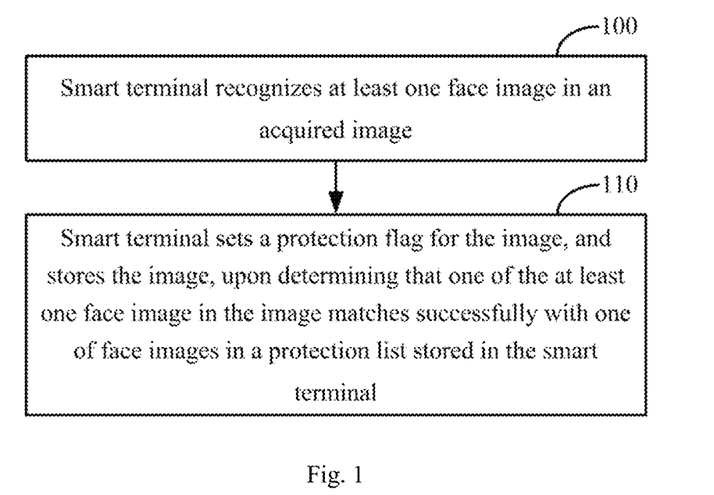
FIG. 1 is a flow chart of a method of setting a protection flag based on face recognition according to some embodiments of the disclosure.

Some embodiments of the disclosure provide a method for setting a protection flag based on face recognition as illustrated in FIG. 1. The method includes the following operations:

Step 100: a smart terminal recognizes at least one face image in an image acquired.

In some embodiments of the disclosure, the recognized face image in the image is surrounded by face recognition box.

Step 110: the smart terminal sets a protection flag for the image, and stores the image, upon determining that one of the at least one face image in the image matches successfully with one of face images in a protection list stored in the smart terminal.

The protection flag is configured to protect the image from accidental deletion.

In some embodiments of the disclosure, in the step 110, upon determining that one of the at least one face image in the image matches successfully with one of face images in the protection list stored in the smart terminal, the smart terminal notifies a user. The user can be notified of the matching success by setting the face recognition box to be red or another color, or otherwise, although the embodiment of the disclosure will not be limited thereto.

In some embodiments of the disclosure, the protection flag which is set for the image can be a read-only flag.

In some embodiments of the disclosure, after the at least one face image in the image is recognized using a face recognition function in the step 100, the method further includes:

The smart terminal transmits a notification message to the user to ask the user to decide whether to set the protection flag for the image, upon determining that none of the at least one face images in the image matches with face images in the protection list; and The smart terminal sets the protection flag for the image, and stores the image, upon reception of a protection instruction transmitted by the user.

In some embodiments of the disclosure, if the smart terminal determines that none of the at least one face image in the image matches with face images in the protection list, then the smart terminal may notify the user, possibly by setting the face recognition box to be blue, and the user may decide whether to set the protection flag for the image, in response to the notification; and The user can alternatively be notified by setting the face recognition box in another color, or other manner, although the embodiment of the disclosure will not be limited thereto.

In some embodiments of the disclosure, if the smart terminal determines that none of the at least one face image in the image matches with face images in the protection list, then an option for setting the protection flag or not may be popped up directly on the image of the smart terminal, and the user may decide as needed whether to set the protection flag for the image.

In some embodiments of the disclosure, in the step 110, the smart terminal recognizes the face image in the image for which the protection flag is set, using a face recognition function, and updates the protection list with the recognized face image.

In some embodiments of the disclosure, the protection list can be initially empty, and the smart terminal can recognize the face image in the image for which the protection flag is set, using the face recognition function, and add the recognized face image to the protection list; or the protection list can initially include a number of preset face images.

Figure 2:
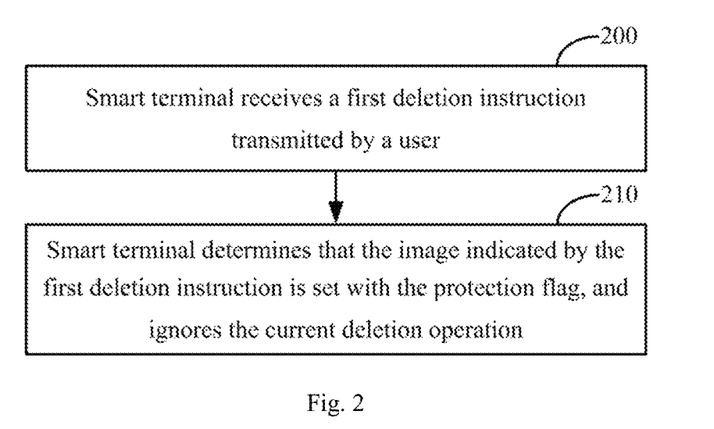
FIG. 2 is a flow chart of a method of protecting an image based on face recognition according to some embodiments of the disclosure.

With the above method as illustrated in FIG. 1, the image acquired which needs to be protected has been set with the protection flag. The protection flag can be used for protecting the image to avoid the important image from being deleted by mistake. Some embodiments of the disclosure provide a method for protecting an image based on face recognition as illustrated in FIG. 2. The method includes the following operations:

Step 200: the smart terminal receives a first deletion instruction transmitted by a user, where the first deletion instruction indicates the image to be deleted.

Step 210: the smart terminal determines that the image indicated by the first deletion instruction is set with the protection flag, and ignores the current deletion operation.

With the method as illustrated in FIG. 2, the smart terminal receiving the first deletion instruction transmitted by the user ignores the current deletion operation upon determining that the image indicated by the first deletion instruction is set with the protection flag, thus avoiding the important image from being deleted by mistake.

Figure 3:
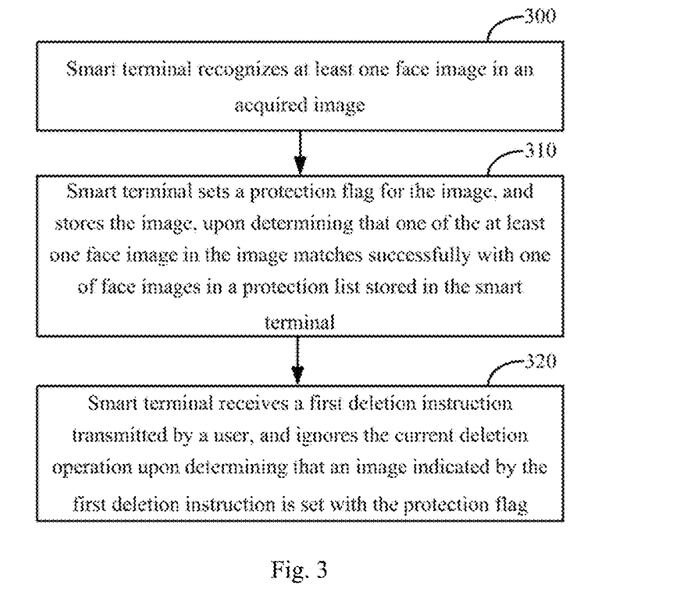
FIG. 3 is a flow chart of another method of protecting an image based on face recognition according to some embodiments of the disclosure.

The above methods in FIG. 1 and FIG. 2 can be performed separately, or can be performed in combination. Some embodiments of the disclosure provide a method for protecting an image based on face recognition as illustrated in FIG. 3, wherein the method includes the following operations:

Step 300: a smart terminal recognizes at least one face image in an image acquired.

In some embodiments of the disclosure, the recognized face image in the image is surrounded by face recognition box.

Step 310: the smart terminal sets a protection flag for the image, and stores the image, upon determining that one of the at least one face image in the image matches successfully with one of face images in a protection list stored in the smart terminal.

In some embodiments of the disclosure, in the step 310, upon determining that one of the at least one face image in the image matches successfully with one of face images in the protection list stored in the smart terminal, the smart terminal notifies a user. The user can be notified of the matching success by setting the face recognition box to be red or another color, or otherwise, although the embodiment of the disclosure will not be limited thereto.

In some embodiments of the disclosure, the protection flag which is set for the image can be a read-only flag.

Step 320, the smart terminal receives a first deletion instruction transmitted by a user, and ignores the current deletion operation upon determining that the image indicated by the first deletion instruction is set with the protection flag, where the first deletion instruction indicates the image to be deleted.

In some embodiments of the disclosure, the smart terminal recognizes one or more face images in the image; the smart terminal sets the protection flag for the image, and stores the image, upon determining that one of the face images in the image matches successfully with one of face images in the protection list stored in the smart terminal; and the smart terminal receiving the first deletion instruction transmitted by the user ignores the current deletion operation upon determining that the image indicated by the first deletion instruction is set with the protection flag, thus avoiding the important image from being deleted by mistake.

In some embodiments of the disclosure, the step 320 further includes:

The smart terminal deletes from the protection list the face image indicated by a removal instruction transmitted by the user, upon reception of the removal instruction, where the removal instruction indicates the face image to be deleted from the protection list; and If one of the at least one face image in the stored image for which the protection flag is set matches successfully with one of face images in the updated protection list, then the smart terminal may reserve the protection flag of the image; and if none of the at least one face image in the stored image for which the protection flag is set matches with face images in the updated protection list, then the smart terminal may delete the protection flag of the image; or The smart terminal determines that the stored image, for which the protection flag is set, includes the face image indicated by the removal instruction, according to the face image indicated by the removal instruction, and deletes the protection flag of the determined image.

In some embodiments of the disclosure, the step 320 further includes:

The smart terminal deletes from the protection list the face image indicated by a second deletion instruction transmitted by the user, upon reception of the second deletion instruction, where the second deletion instruction indicates the face image to be deleted from the protection list; and If one of the at least one face image in the stored image for which the protection flag is set matches successfully with one of face images in the updated protection list, then the smart terminal may reserve the protection flag of the image; and if none of the face image in the stored image for which the protection flag is set matches with face images in the updated protection list, then the smart terminal may delete the image; or The smart terminal determines that the stored image, for which the protection flag is set, includes the face image indicated by the second deletion instruction, according to the face image indicated by the second deletion instruction, and deletes the determined image.

In some embodiments of the disclosure, the protection list can be set in a protection-first mode or a deletion-first mode; and the user can set the mode of the protection list as needed.

Figure 4:
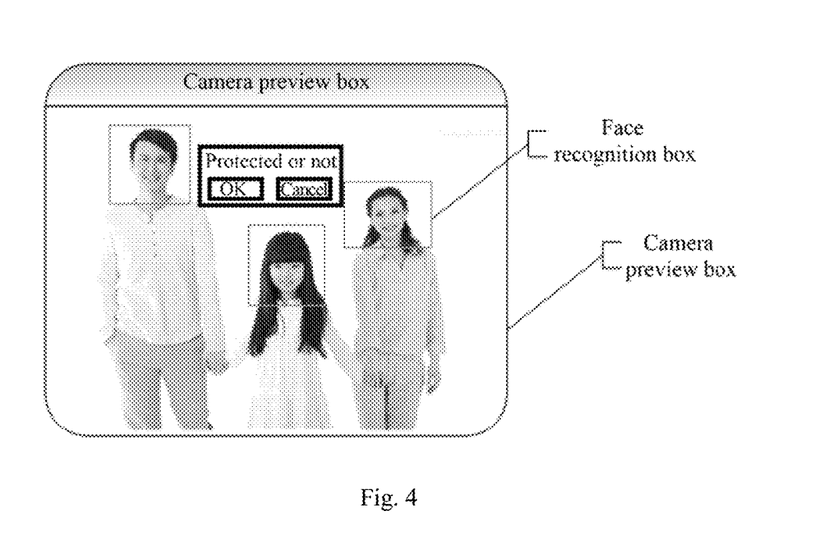
FIG. 4 is a schematic diagram of a preview interface according to some embodiments of the disclosure.

In some embodiments of the disclosure, as illustrated in FIG. 4, when the smart terminal captures an image, the smart terminal recognizes face images in the image using the face recognition function in a preview interface, where the recognized face images are surrounded by face recognition boxes; and if the smart terminal determines that none of the face images in the image matches with face images in the protection list, then the face recognition boxes may be displayed in green, and the user may press for long time the area where one of the face images is located, as illustrated in FIG. 4, so that the "Protected or not" box will be popped up in the preview interface, and if the user needs to protect the image, then the user may click on the "OK" button in the "Protected or not" box; or if the user does not need to protect the image, or the user has performed an operation by mistake, then the user may click on the "Cancel" button in the "Protected or not" box.

If the user clicks on the "OK" button in the "Protected or not" box, the smart terminal receives the protection instruction transmitted by the user, and the smart terminal may set the protection flag for the image, and store the image.

In some embodiments of the disclosure, the smart terminal further recognizes the face image in the image for which the protection flag is set, using the face recognition function, and updates the protection list with the recognized face image.

Figure 5:
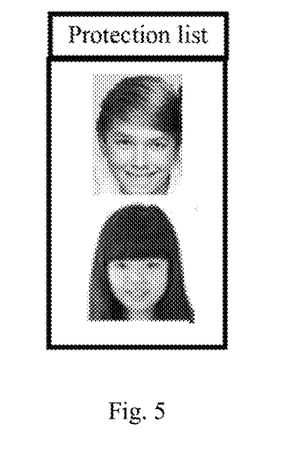
FIG. 5 is a schematic diagram of a protection list according to some embodiments of the disclosure.

The protection list is as illustrated in FIG. 5.

Figure 6:
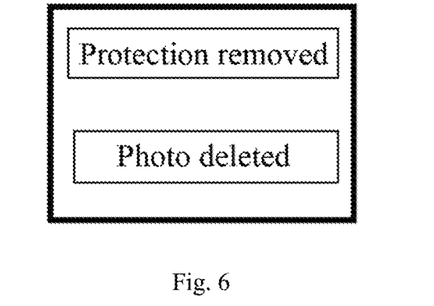
FIG. 6 is a schematic diagram of a selection box according to some embodiments of the disclosure.

In some embodiments of the disclosure, if the user needs to remove the protection flag of the image which includes the face image in the protection list, or the user needs to delete the image which includes the face image in the protection, then the user may press for long the area where the face image is located in FIG. 5, so that the "Protection removed" button and the "Photo deleted" button as illustrated in FIG. 6 will be popped up in the protection list, and the user can select as needed.

If the user clicks on the "Protection removed" button, then the smart terminal may receive the removal instruction transmitted by the user, and delete the face image indicated by the removal instruction from the protection list, and subsequently proceed in the following two approaches:

In a first approach, if the protection list is in the protection-first mode, then if one face image in the image stored for which the protection flag is set matches successfully with one of face images in the updated protection list, then the smart terminal may reserve the protection flag of the image; and if none of the face image in the image stored for which the protection flag is set matches with face images in the updated protection list, then the smart terminal may delete the protection flag of the image.

In a second approach, if the protection list is in the deletion-first mode, then the smart terminal may determine that the image stored, for which the protection flag is set, includes the face image indicated by the removal instruction, according to the face image indicated by the removal instruction, and delete the protection flag of the determined image.

If the user clicks on the "Photo deleted" button, then the smart terminal may receive the second deletion instruction transmitted by the user, and delete from the protection list the face image indicated by the second deletion instruction, and subsequently proceed in the following two approaches:

In a first approach, if the protection list is in the protection-first mode, then if one face image in the stored image for which the protection flag is set matches successfully with one of face images in the updated protection list, then the smart terminal may reserve the protection flag of the image; and if none of the face image in the stored image for which the protection flag is set matches with face images in the updated protection list, then the smart terminal may delete the image.

In a second approach, if the protection list is in the deletion-first mode, then the smart terminal may determine that the stored image, for which the protection flag is set, includes the face image indicated by the second deletion instruction, according to the face image indicated by the second deletion instruction, and delete the determined image.

Figure 7:
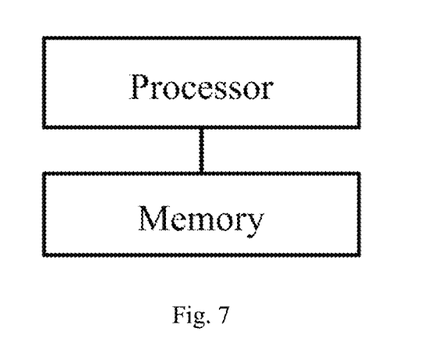
FIG. 7 is a schematic diagram of a smart terminal according to some embodiments of the disclosure.

Some embodiments of the disclosure further provide a smart terminal, which can perform the method of protecting an image according to the embodiments above, as illustrated in FIG. 7, where the smart terminal includes a memory and one or more processors; the memory stores computer readable program codes, and the one or more processors execute the computer readable program codes:

To recognize at least one face image in an image acquired;

To set a protection flag for the image, and to store the image, upon determining that one of the at least one face image in the image matches successfully with one of face images in a protection list stored in the smart terminal, wherein the protection is configured to protect the image from accidental deletion.

In some embodiments, the one or more processors are further configured to receive a first deletion instruction transmitted by a user, and ignore a current deletion operation upon determining that the image indicated by the first deletion instruction is set with the protection flag.

Some embodiments of the disclosure provides a smart terminal, where the smart terminal capturing an image recognizes at least one face image in the image using a face recognition function; the smart terminal sets a protection flag for the image, and stores the image, upon determining that one of the at least one face image in the an image matches successfully with one of face images in a protection list stored in the smart terminal; the smart terminal receives a first deletion instruction transmitted by a user and ignores the current deletion operation upon determining that the image indicated by the first deletion instruction is set with the protection flag, thus avoiding the important image from being deleted by mistake.

In some embodiments of the disclosure, the processor is further configured:

To transmit a notification message to the user to ask the user to decide whether to set the protection flag for the image, upon determining that none of the at least one face image in the image matches with face images in the protection list; and To set the protection flag for the image, and to store the image, upon reception of a protection instruction transmitted by the user.

In some embodiments of the disclosure, the processor is further configured:

To recognize the face image in the image for which the protection flag is set, and to update the protection list with the recognized face image.

In some embodiments of the disclosure, the processor is further configured:

To delete from the protection list the face image indicated by a removal instruction transmitted by the user, upon reception of the removal instruction; and If one of the at least face image in the stored image for which the protection flag is set matches successfully with one of face images in the updated protection list, to reserve the protection flag of the image; and if none of the at least one face image in the stored image for which the protection flag is set matches with face images in the updated protection list, to delete the protection flag of the image; or To determine that the stored image, for which the protection flag is set, includes the face image indicated by the removal instruction, according to the face image indicated by the removal instruction, and to delete the protection flag of the determined image.

In some embodiments of the disclosure, the processor is further configured:

To delete from the protection list the face image indicated by a second deletion instruction transmitted by the user, upon reception of the second deletion instruction; and If one of the at least one face image in the stored image for which the protection flag is set matches successfully with one of face images in the updated protection list, to reserve the protection flag of the image; and if none of the at least one face image in the stored image for which the protection flag is set matches with the face images in the updated protection list, to delete the image; or To determine that the stored image, for which the protection flag is set, includes the face image indicated by the second deletion instruction, according to the face image indicated by the second deletion instruction, and to delete the determined image.

Figure 8:
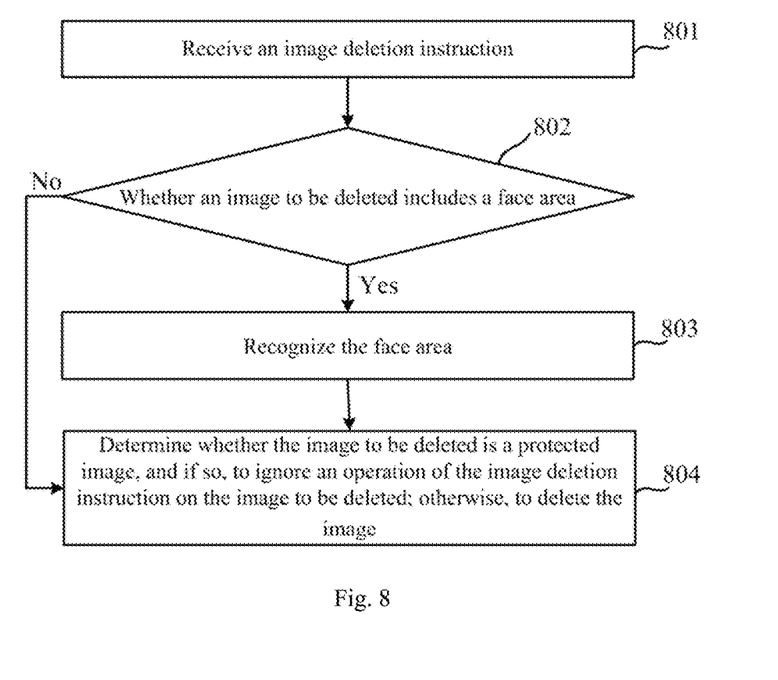
FIG. 8 is a flow chart of a method of protecting an image based on face recognition according to some embodiments of the disclosure.

As illustrated in FIG. 8, some embodiments of the disclosure further provides a method of protecting an image based on face recognition, where the method includes:

The step 801 is to receive an image deletion instruction;

The smart terminal receives the image deletion instruction transmitted by a user, where the image deletion instruction indicates an image to be deleted.

The step 802 is to determine whether an image to be deleted includes a face area, and if so, then the flow will proceed to the step 803; otherwise, the flow will proceed to the step 804.

The step 803 is to recognize the face area.

The smart terminal can recognize the face area in the image to be deleted using any one face recognition technology. The recognized face area can be one or more.

The step 804 is to determine whether the image to be deleted is a protected image, and if so, to ignore an operation of the image deletion instruction on the image to be deleted; otherwise, to delete the image.

Whether the image to be deleted is a protected image or not can be determined in a number of approaches particularly as follows:

In a first approach, in some embodiments of the disclosure, a protection list of protected face areas is stored in the smart terminal. In the step 804, the smart terminal may determine whether the face area recognized in the image to be deleted matches with one of the protected face areas, and if successfully matches, then the image to be deleted can be a protected image. Particularly the smart terminal determines that the image to be deleted is a protected image upon determining that the face area in the image to be deleted matches with one of the protected face areas in the protection list.

In a second approach, in some embodiments of the disclosure, the user can preset as needed one or more images to be protected. The smart terminal receives a predetermined image, and determines whether a user setting instruction is received to instruct the predetermined image to be set as a protected image, and if so, then the smart terminal can set the predetermined image as a protected image. The user can preset some images as protected images, and a list of protected images can be stored in the smart terminal, so in the step 804, the smart terminal can determine directly whether the image to be deleted is one of the protected images stored in the smart terminal. The user setting instruction can be transmitted by the user to the smart terminal through a display screen.

In the disclosure, whether the image to be deleted is a protected image or not can be determined in the first approach or the second approach or the first approach and the second approach in combination. If whether the image to be deleted is a protected image is determined by the first approach and the second approach in combination, then it is firstly determined in the first approach whether the image to be deleted is a protected image or not, and if the image is determined not to be a protected image in the first approach, then it is further determined in the second approach whether the image to be deleted is a protected image or not. Alternatively whether the image to be deleted is a protected image can be determined firstly in the second approach, and if the image is determined not to be a protected image in the second approach, then it is further determined in the first approach whether the image to be deleted is a protected image.

In some embodiments of the disclosure, if it is determined that the image to be deleted is a protected image, then a protection flag may be set for the image to be deleted, where the protection flag can be located anywhere in the image to be deleted, e.g., at the bottom left corner, and the protection flag can be a letter and/or a symbol. The embodiment of the disclosure will not be limited to any particular position and form of the protection flag.

In some embodiments of the disclosure, in the step 804, if it is determined that the image to be deleted is not a protected image, then the image may be deleted directly. In some alternative embodiments of the disclosure, if it is determined that the image to be deleted is not a protected image, then the smart terminal may transmit a notification message to the user to ask the user to decide whether to protect the image, and set the protection flag for the image to be deleted, and store the image to be deleted, upon reception of a protection instruction transmitted by the user.

In the first approach, for example, the smart terminal can delete the image directly upon determining that none of the face areas in the image matches with one of face areas in the protection list. Alternatively if the smart terminal determines that none of the face areas in the image matches with one of face areas in the protection list, then an option for setting the protection flag or not may be popped up directly on the image of the smart terminal, and the user may decide as needed whether to set the protection flag for the image.

In some embodiments of the disclosure, the smart terminal receiving the image deletion instruction can alternatively determine directly whether the image to be deleted is one of the protected image stored in the smart terminal, and if not, then the smart terminal will further proceed to the steps 802 and 803, determine whether the image to be deleted is a protected image, against the protected face areas in the protection list in the step 804, and perform subsequent operations.

In some embodiments of the disclosure, in the step 802, if it is determined that the image to be deleted doesn't include the face area, then the image can be deleted directly. Alternatively in the step 802, if it is determined that the image to be deleted doesn't include the face area, then the step 804 can be performed to determine whether the image to be deleted is a protected image in the second approach, and subsequent operations will be performed.

With the solution according to the embodiments above, whether the image to be deleted is a protected image can be determined by comparing the face area in the image to be deleted with the protected face areas, or whether the image to be deleted is a protected image can be determined directly as preset by the user, or it can be determined in both of them, thus avoiding the important image from being deleted by mistake.

Figure 9:
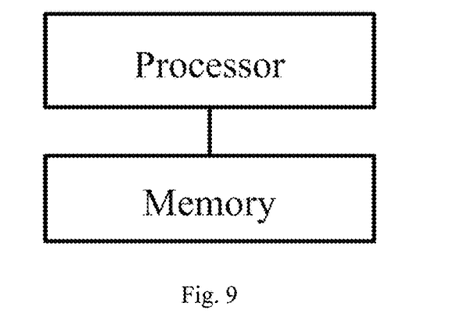
FIG. 9 is a schematic diagram of a smart terminal according to some embodiments of the disclosure.

Some embodiments of the disclosure further provide a smart terminal, which can perform the method of protecting an image according to the embodiments above, as illustrated in FIG. 9, where the smart terminal includes a memory and one or more processors; the memory stores computer readable program codes, and the one or more processors execute the computer readable program codes:

To receive an image deletion instruction;

To determine whether an image to be deleted includes a face area; and

If the image to be deleted comprises the face area, to recognize the face area,

To determine that the image to be deleted is a protected image, and

To ignore an operation of the image deletion instruction on the image to be deleted.

In some embodiments of the disclosure, the smart terminal further includes the one or more processors executing the computer readable program codes:

Before the operation of the image deletion instruction on the image to be deleted is ignored, To set a protection flag for the image to be deleted.

In some embodiments of the disclosure, the protection flag is located anywhere in the image to be deleted, and the protection flag is a letter and/or a symbol.

In some embodiments of the disclosure, the one or more processors configured to determine that the image to be deleted is a protected image are configured:

To determine whether the face area in the image to be deleted matches with a protected face area, and if so, to determine that the image to be deleted is a protected image.

In some embodiments of the disclosure, the smart terminal further includes the one or more processors executing the computer readable program codes:

To receive a predetermined image; and

To determine whether a user setting instruction is received to instruct the predetermined image to be set as a protected image, and if so, to set the predetermined image as a protected image.

In some embodiments of the disclosure, the smart terminal includes a display screen, and the user setting instruction is transmitted by the user to the smart terminal through the display screen.

In some embodiments of the disclosure, the memory is further configured to store a list of protected images including at least one protected image.

Figure 10:
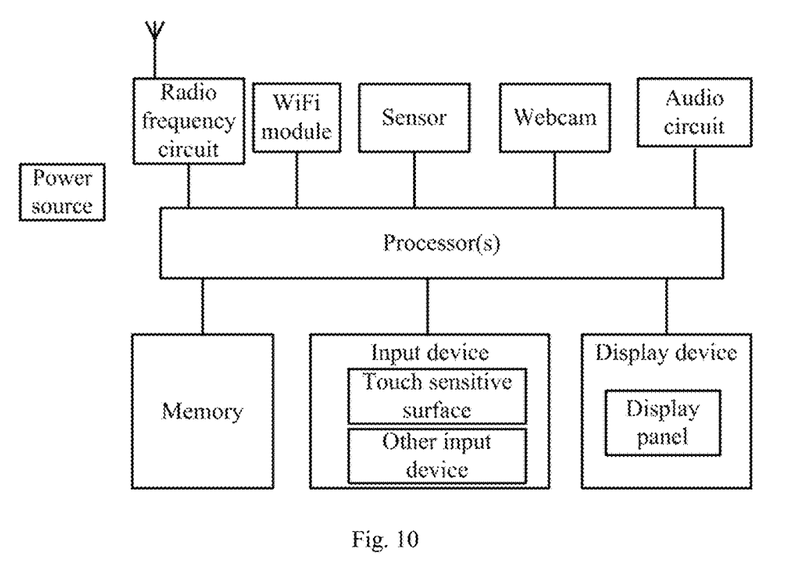
FIG. 10 is a schematic diagram of a smart terminal according to some embodiments of the disclosure.

Some embodiments of the disclosure further provide a smart terminal which can perform the method of protecting an image according to the embodiments above, and as illustrated in FIG. 10, the smart terminal can be any one of various handheld devices (e.g., a mobile phone, an IPAD, etc.), which can include a processor including one or more processing cores, a memory including one more computer readable storage mediums, a webcam, a radio frequency circuit, a memory including one or more computer readable storage mediums, an input device, a display device, a sensor, an audio circuit, a WiFi module, a power source, and other components. Those skilled in the art can appreciate that the structure of the smart terminal in this embodiment will not be intended to be limiting, but can include more or less components, or have some of the components combined, or include different components arranged, where:

The webcam can be configured to acquire an image.

The memory can be configured to store software programs and modules, and the processor can be configured to run the software programs and modules stored in the memory to thereby perform various function applications and data processing. The memory can generally include a program storage area and a data storage area, where an operating system, applications required for at least one function (e.g., an audio playing function, an image playing function, etc.), etc., can be stored in the program storage area; and data created for use of the smart terminal (e.g., audio data, a phone book etc.), etc., can be stored in the data storage area. Additionally the memory can include a high-speed random access memory and can further include a nonvolatile memory, e.g., at least one magnetic-disk memory device, a flash memory device or another volatile solid memory device. Correspondingly the memory can further include a memory controller configured to provide an access of the processor and the input device to the memory.

The processor is a control component of the smart terminal, has the respective components connected by various interfaces and lines, and runs or executes the software programs and/or modules stored in the memory and invokes the data stored in the memory to perform the various functions of the smart terminal and process the data to thereby manage and control the handset as a whole. Optionally the processor can include one or more processing cores; and preferably the processor can be integrated with an application processor and a modem processor, where the application processor generally handles the operating system, the user interfaces, the applications, etc., and the modem processor generally handles wireless communication. As can be appreciated, the modem processor above may not be integrated into the processor.

The radio frequency circuit can be configured to receive and transmit a signal in the course of receiving and transmitting information or in communication, particularly by transferring downlink information of a base station to the one or more processors for processing upon reception of the downlink information; and also transmitting uplink data to the base station. Typically the radio frequency circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the radio frequency circuit can further communicate with a network and another device through wireless communication. The wireless communication can comply with any of communication standards or protocols including but not limited to the GSM (Global System of Mobile communication), the GPRS (General Packet Radio Service), the CDMA (Code Division Multiple Access), the WCDMA (Wideband Code Division Multiple Access), the LTE (Long Term Evolution), an e-mail, the SMS (Short Messaging Service), etc.

The input device can be configured to receive input digital or character information and to generate a keyboard, a mouse, a joystick, or an optical or track ball signal input related to user setting and function control. Particularly the input device can include a touch sensitive surface and another input device. The touch sensitive surface, also referred to as a touch display screen or a touch control pad, can be configured to collect a touch operation by a user thereon or in proximity thereto (e.g., an operation by the user on or in proximity to the touch sensitive surface using his or her finger, a stylus or any other appropriate object or attachment), and to drive a corresponding connected device by preset program. Optionally the touch sensitive surface can include two components which are a touch detection device and a touch controller, where the touch detection device detects the position of touching by the user, detects a signal as a result of the touch operation, and transfers the signal to the touch controller; and the touch controller receives the touch signal from the touch detection device and converts it into coordinates of a touch point and further transfers them to the processor, and can receive and execute a command sent by the processor. Moreover the touch sensitive surface can be embodied in various types of resistive, capacitive, infrared, surface sound wave and other types. The input device can further include another input device in addition to the touch sensitive surface. Particularly the other input device can include but will not be limited to one or more of a physical keyboard, functional keys (e.g., volume control buttons, a power-on or -off button, etc.), a track ball, a mouse, a joystick, etc.

The display device can be configured to display information input by the user or information provided to the user and various graphic user interfaces of the smart terminal, where these graphic user interfaces can be composed of graphics, texts, icons, videos and any combination thereof. The display device can include a display panel which can be optionally configured in the form of a Liquid Crystal Display (LCD), an Organic Light-Emitting Diode (OLED) display, etc. Furthermore the touch sensitive surface can overlie the display panel, and the touch sensitive surface, upon detection of the touch operation thereon or in proximity thereto, transfers it to the processor to determine the type of the touch event, and thereafter the processor provides a corresponding visual output on the display panel according to the type of the touch event. Although the touch sensitive surface and the display device are embodied in this embodiment as two separate components to perform the input and output functions, the touch sensitive surface and the display device can be integrated to perform the input and output functions in some embodiments.

The smart terminal can further include at least one sensor, e.g., an optical sensor, a motion sensor, and other sensors. Particularly the optical sensor can include an ambient optical sensor and a proximity sensor, where the ambient optical sensor can adjust the brightness of the display panel according to the luminosity of ambient light rays, and the proximity sensor can power off the display panel and/or a backlight when the smart terminal moves in proximity to an ear. A gravity acceleration sensor which is a motion sensor can detect the magnitudes of accelerations in respective directions (typically three axes), can detect the magnitude and the direction of gravity when the sensor is stationary, and can be configured to perform applications of identifying the posture of a handset (e.g., switching between landscape and portrait modes, relevant games, calibration of the posture of a magnetometer, etc.), a relevant function of identifying vibration (e.g., a pedometer, a knock, etc.), etc.; and the smart terminal can be further configured with a gyroscope, a barometer, a hygrometer, a thermometer, an infrared sensor and other sensors, although a repeated description of these components will be omitted here.

The audio circuit, a speaker and a transducer can provide an audio interface between the user and the smart terminal. The audio circuit can convert received audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor for processing and then transmitted to another apparatus through the radio frequency circuit, for example, or the audio data is output to the memory for further processing. The audio circuit may further include an earphone jack for communication between a peripheral earphone and the smart terminal.

The WiFi falls into the category of short-range wireless transmission technologies, and the smart terminal can assist the user in receiving and transmitting an e-mail, browsing a webpage, accessing streaming media, etc., through the WiFi module by which the user is provided with a wireless access to the broadband Internet. Although the WiFi module is illustrated in this embodiment, it can be appreciated that it may not be necessarily required for the smart terminal, but can be omitted as desired without departing from the scope of the disclosure.

The smart terminal further includes a power source (e.g., a battery) powering the respective components, and preferably the power source can be logically connected with the processor through a power management system to thereby perform charging and discharging management, power consumption management, etc., through the power management system. The power source can further include one or more DC or AC power sources, recharging systems, power source failure detection circuits, power source transformers or inverters, power source status indicators, and any other components.

Although not illustrated, the smart terminal can further include a Bluetooth module, etc., though a repeated description thereof will be omitted here.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of protecting an image based on face recognition, the method comprising:
    recognizing, by a smart terminal, at least one face image in an acquired image;
    setting, by the smart terminal, a protection flag for the acquired image, and storing the acquired image, upon determining that one of the at least one face image in the acquired image matches successfully with one of a plurality of face images in a protection list stored in the smart terminal, wherein the protection flag comprises a read-only flag configured to protect the acquired image from accidental deletion;
    transmitting, by the smart terminal, a notification message to a user to allow the user to decide whether to set the protection flag for the acquired image upon determining that none of the at least one face image in the acquired image matches with the face images in the protection list; and
    setting, by the smart terminal, the protection flag for the acquired image and storing the acquired image, upon receiving a protection instruction sent by the user.

2. The method according to claim 1, further comprising:
    receiving, by the smart terminal, a first deletion instruction transmitted by a user, and ignoring a current deletion operation upon determining that the acquired image indicated by the first deletion instruction is set with the protection flag.

3. The method according to claim 1, further comprising:
    recognizing, by the smart terminal, the face image in the acquired image for which the protection flag is set, and updating the protection list with the recognized face image.

4. The method according to claim 1, further comprising:
    upon receiving a removal instruction sent by a user, deleting, by the smart terminal, from the protection list the face image indicated by the removal instruction;
    when one of the at least one face image in the stored image for which the protection flag is set matches successfully with one of the face images in the updated protection list, reserving, by the smart terminal, the protection flag of the image; and
    when none of the at least one face image in the stored image for which the protection flag is set matches with the face images in the updated protection list, deleting, by the smart terminal, the protection flag of the image; or
    determining, by the smart terminal, that the stored image, for which the protection flag is set, comprises the face image indicated by the removal instruction, according to the face image indicated by the removal instruction, and deleting the protection flag of the determined image.

5. The method according to claim 1, further comprising:
    upon receiving a second deletion instruction sent by a user, deleting, by the smart terminal, from the protection list the face image indicated by the second deletion instruction; and
    when one of the at least one face image in the stored image for which the protection flag is set matches successfully with one of the face images in the updated protection list, reserving, by the smart terminal, the protection flag of the image; and
    when none of the at least one face image in the stored image for which the protection flag is set matches with face images in the updated protection list, deleting, by the smart terminal, the image; or determining, by the smart terminal, that the stored image, for which the protection flag is set, comprises the face image indicated by the second deletion instruction, according to the face image indicated by the second deletion instruction, and deleting the determined image.

6. A smart terminal comprising:

a memory; and one or more processors, wherein the memory is configured to store computer readable program codes, and the one or more processors are configured to execute the computer readable program codes to:

recognize at least one face image in an acquired image;

set a protection flag for the acquired image and store the acquired image, upon determining that one of the at least one face image in the acquired image matches successfully with one of a plurality of face images in a protection list stored in the smart terminal, wherein the protection flag comprises a ready-only flag configured to protect the acquired image from accidental deletion;

transmit a notification message to a user to allow the user to decide whether to set the protection flag for the acquired image, upon determining that none of the at least one face image in the image matches with the face images in the protection list; and upon receiving a protection instruction sent by the user, set the protection flag for the image, and store the image.

7. The smart terminal according to claim 6, the one or more processors are further configured to execute the computer readable program codes to:

receive a first deletion instruction transmitted by a user, and ignore a current deletion operation upon determining that the acquired image indicated by the first deletion instruction is set with the protection flag.

8. The smart terminal according to claim 6, the one or more processors are further configured to execute the computer readable program codes to:

recognize the face image in the image for which the protection flag is set, and update the protection list with the recognized face image.

9. The smart terminal according to claim 6, the one or more processors are further configured to execute the computer readable program codes to:

upon receiving a removal instruction sent by a user, delete from the protection list the face image indicated by the removal instruction;

when one of the at least one face image in the stored image for which the protection flag is set matches successfully with one of the face images in the updated protection list, reserve the protection flag of the image; and when none of the at least one face image in the stored image for which the protection flag is set matches with face images in the updated protection list, delete the protection flag of the image; or determine that the stored image, for which the protection flag is set, comprises the face image indicated by the removal instruction, according to the face image indicated by the removal instruction, and delete the protection flag of the determined image.

10. The smart terminal according to claim 6, the one or more processors are further configured to execute the computer readable program codes to:

upon receiving a second deletion instruction sent by a user, delete from the protection list the face image indicated by the second deletion instruction;

when one of the at least one face image in the stored image for which the protection flag is set matches successfully with one of the face images in the updated protection list, reserve the protection flag of the image; and when none of the at least one face image in the stored image for which the protection flag is set matches with face images in the updated protection list, delete the image; or determine that the stored image, for which the protection flag is set, comprises the face image indicated by the second deletion instruction, according to the face image indicated by the second deletion instruction, and delete the determined image.

11. A smart terminal, comprising:

a memory; and one or more processors, wherein the memory is configured to store computer readable program codes, and the one or more processors are configured to execute the computer readable program codes to:

receive an image deletion instruction;

determine whether an image to be deleted comprises a face area;

when the image to be deleted comprises the face area, recognize the face area and determine whether the face area in the image to be deleted matches with a protected face area;

in response to the face area in the image to be deleted matching the protected face area, determine that the image to be deleted is a protected image, set a protection flag for the image to be deleted and ignore an operation of the image deletion instruction on the image to be deleted, wherein the protection flag comprises a read-only flag configured to protect the image from accidental deletion;

in response to no face area in the image to be deleted matching with the protected face area, transmit a notification to a user to allow the user to decide whether to set the protection flag for the image to be deleted; and upon receiving a protection instruction sent by the user, set the protection flag for the image to be deleted and ignore an operation of the image deletion instruction on the image to be deleted.

12. The smart terminal according to claim 11, wherein the protection flag is located anywhere in the image to be deleted, and wherein the protection flag is a letter and/or a symbol.

13. The smart terminal according to claim 11, wherein the one or more processors are configured to execute the computer readable program codes to:

receive a predetermined image; and upon receiving an instruction for setting the predetermined image as a protected image, set a protection flag the predetermined image as a protected image.

14. The smart terminal according to claim 13, further comprising a display screen, wherein the instruction for setting the predetermined image as the protected image is sent from a user to the smart terminal through the display screen of the smart terminal.

15. The smart terminal according to claim 11, wherein the memory is further configured to store a list of protected images comprising at least one protected image.

* * * * *